(12) United States Patent
Takagi et al.

(10) Patent No.: US 10,139,549 B2
(45) Date of Patent: Nov. 27, 2018

(54) LIGHT GUIDE BODY, LIGHT EMITTING APPARATUS, AND AMUSEMENT MACHINE

(71) Applicant: OMRON Corporation, Kyoto-shi, Kyoto (JP)

(72) Inventors: Yoshihiko Takagi, Kyoto (JP); Masayuki Shinohara, Kyoto (JP); Yoshimasa Osumi, Kyoto (JP); Norikazu Kitamura, Osaka (JP)

(73) Assignee: OMRON Corporation, Kyoto (JP)

( * ) Notice: Subject to any disclaimer, the term of this patent is extended or adjusted under 35 U.S.C. 154(b) by 82 days.

(21) Appl. No.: 14/552,035

(22) Filed: Nov. 24, 2014

(65) Prior Publication Data
US 2015/0168627 A1 Jun. 18, 2015

(30) Foreign Application Priority Data
Dec. 16, 2013 (JP) .................. 2013-259594

(51) Int. Cl.
*F21V 7/04* (2006.01)
*F21V 8/00* (2006.01)

(52) U.S. Cl.
CPC .......... *G02B 6/006* (2013.01); *G02B 6/0036* (2013.01); *G02B 6/0068* (2013.01)

(58) Field of Classification Search
CPC ..... G02B 6/006; G02B 6/0036; G02B 6/0068
USPC ........................................ 362/613
See application file for complete search history.

(56) References Cited

U.S. PATENT DOCUMENTS

2001/0027293 A1* 10/2001 Joshi ................. A61M 5/30
604/131
2002/0080598 A1* 6/2002 Parker .............. G02B 6/0021
362/616
2008/0316744 A1* 12/2008 Hirota ............... G02B 5/021
362/247

(Continued)

FOREIGN PATENT DOCUMENTS

JP H11-85075 A 3/1999
JP 2006-075362 A 3/2006

(Continued)

OTHER PUBLICATIONS

Notification of Reasons for Refusal issued in corresponding Application No. JP 2013-259594 dated Oct. 3, 2017 (6 pages).

*Primary Examiner* — Anh Mai
*Assistant Examiner* — Meghan Ulanday
(74) *Attorney, Agent, or Firm* — Osha Liang LLP (57) ABSTRACT

A light guide body configured to guide light that enters therein has a light exit surface through which light from the at least one light source exits, and a plurality of linearly arranged pattern groups, each of which has a plurality of linearly arranged reflection patterns that reflect the light from the at least one light source toward the light exit surface. At least one of the plurality of linearly arranged pattern groups differs from at least another of the plurality of linearly arranged pattern groups in light amount difference. The light amount difference is a difference between an amount of light which reaches an observer of the light exit surface after being reflected by each of the plurality of linearly arranged pattern groups and an amount of light which reaches the observer through a region which is adjacent to each of the plurality of linearly arranged pattern groups.

15 Claims, 6 Drawing Sheets

(56) References Cited

U.S. PATENT DOCUMENTS

| | | | |
|---|---|---|---|
| 2009/0168457 A1* | 7/2009 | Lai | F21S 8/00 362/618 |
| 2012/0087147 A1* | 4/2012 | Hudson | F21V 11/00 362/605 |

FOREIGN PATENT DOCUMENTS

| | | |
|---|---|---|
| JP | 2011-215320 A | 10/2011 |
| WO | 2007/088621 A1 | 8/2007 |

* cited by examiner

LIGHT GUIDE BODY, LIGHT EMITTING APPARATUS, AND AMUSEMENT MACHINE

CROSS-REFERENCE TO RELATED APPLICATIONS

This Nonprovisional application claims priority under 35 U.S.C. § 119 on Patent Application No. 2013-259594 filed in Japan on Dec. 16, 2013, the entire contents of which are hereby incorporated by reference.

BACKGROUND

Technical Field

The present invention relates to a light guide body in which light emitted from a light source and having entered the light guide body is guided and emitted through a light exit surface, a light emitting apparatus including the light guide body, and an amusement machine.

Related Art

Conventionally, there is known a technique in which light emitted from a light source enters a light guide plate through a side surface of the light guide plate and the light is reflected by a reflection pattern, provided on a back surface of the light guide plate, so as to exit through a front surface of the light guide plate.

For example, Patent Literature 1 discloses a technique in which a reflection pattern is provided in a region, having a shape corresponding to a predetermined text, of a back surface of a light guide plate, so that a region of a front surface of the light guide plate which region corresponds to the text emits light.

CITATION LIST

Patent Literature

Patent Literature 1 Japanese Patent Application Publication, Tokukaihei, No. 11-85075 A (Publication Date: Mar. 30, 1999)

SUMMARY

However, although the technique disclosed in Patent Literature 1 makes it possible to display the text corresponding to the shape of the reflection pattern, the technique merely allows carrying out planar text display because the emitted light is substantially uniform throughout the area of the text.

One or more embodiments of the present invention allows an observer to stereoscopically visually recognize a light emitting region set in a light exit surface of a light guide body which guides light emitted from a light source and causes the light to exit through the light emitting region.

According to one or more embodiments of the present invention, a light guide body guides light having entered the light guide body from at least one light source and causes the light to exit through a light exit surface of the light guide body, the light guide body including: a plurality of linearly arranged pattern groups in each of which a plurality of reflection patterns for reflecting the light from the at least one light source toward the light exit surface are linearly arranged, at least one of the plurality of linearly arranged pattern groups differing from the other(s) of the plurality of linearly arranged pattern groups in light amount difference, the light amount difference being a difference between an amount of light which reaches an observer of the light exit surface after being reflected by each of the plurality of linearly arranged pattern groups and an amount of light which reaches the observer through a region which is adjacent to each of the plurality of linearly arranged pattern groups, or the at least one of the plurality of linearly arranged pattern groups differing from the other(s) of the plurality of linearly arranged pattern groups in color difference between the light which reaches the observer of the light exit surface after being reflected by each of the plurality of linearly arranged pattern groups and the light which reaches the observer through the region which is adjacent to each of the plurality of linearly arranged pattern groups.

One or more embodiments of the present invention provides a light guide body which, by causing a difference in perspective between light emitting regions, allows an observer to stereoscopically visually recognize the light emitting regions, a light emitting apparatus, and an amusement machine.

BRIEF DESCRIPTION OF DRAWINGS

FIGS. 1(*a*)-1(*b*) is an explanatory drawing schematically illustrating a configuration of a light emitting apparatus including a light guide plate according to one or more embodiments of the present invention. FIG. 1(*a*) is a top view of the light emitting apparatus, and FIG. 1(*b*) is a perspective view of the light emitting apparatus.

FIGS. 3(*a*)-3(*c*) are top views illustrating respective light emitting regions illustrated in FIGS. 1(*a*)-1(*b*).

FIGS. 4(*a*)-4(*c*) are top views each showing an example of how reflection patterns are arranged in each of linearly arranged pattern groups illustrated in FIGS. 3(*a*)-(*c*).

FIGS. 5(*a*)-5(*c*) are top views each showing another example of how the reflection patterns are arranged in each of the linearly arranged pattern groups illustrated in FIGS. 3(*a*)-3(*c*).

FIGS. 6(*a*)-6(*c*) are top views each showing still another example of how the reflection patterns are arranged in each of the linearly arranged pattern groups illustrated in FIGS. 3(*a*)-3(*c*).

FIGS. 8(*a*)-(*e*) are top views each showing a modified example of a light emitting region.

FIGS. 9(*a*)-9(*d*) are cross-sectional views each showing a modified example of the reflection pattern.

DETAILED DESCRIPTION

Embodiments of the present invention are described below with reference to FIGS. 1(*a*) through 9(*d*). In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. An example of a light emitting apparatus that includes a light guide body will be described below.

<Configuration of Light Emitting Apparatus 1>

Figure 1:
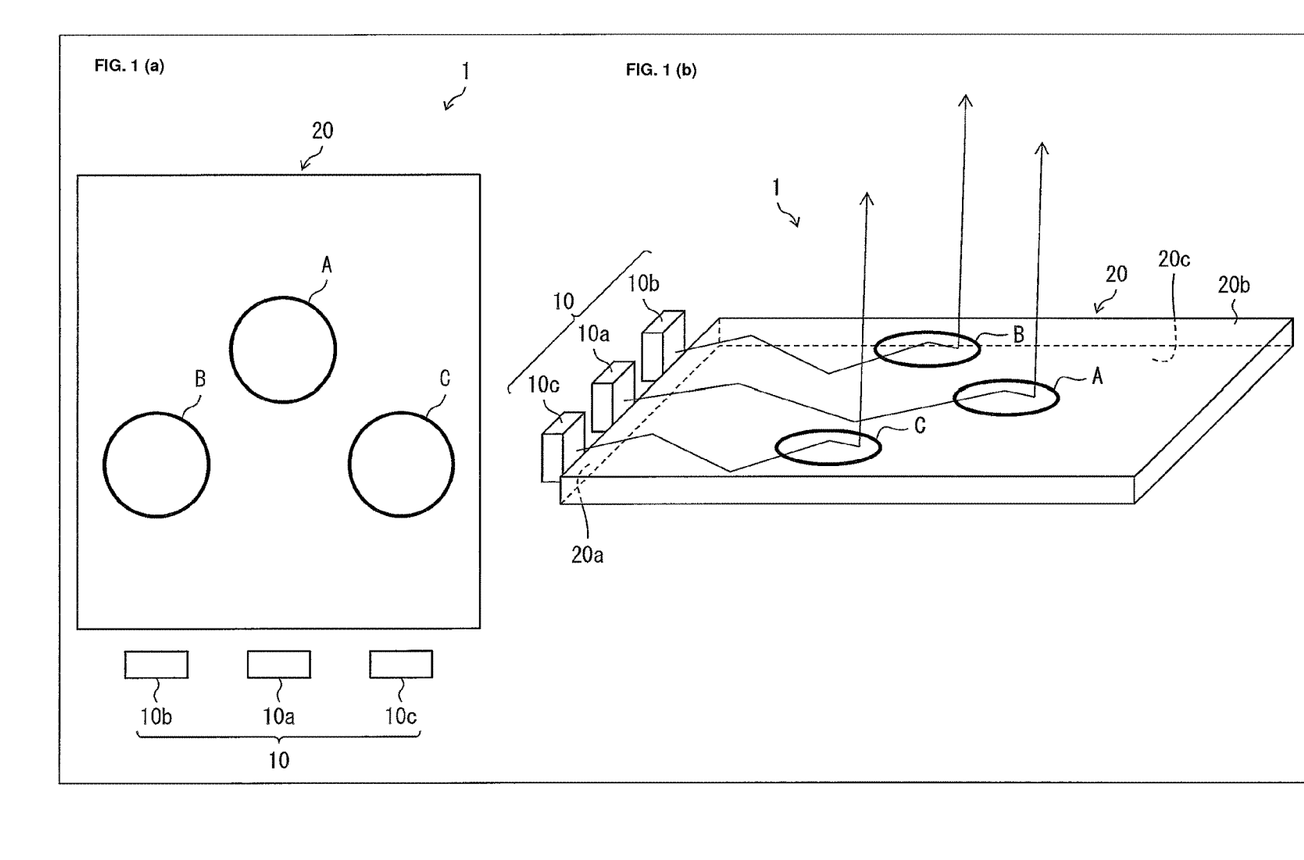

FIGS. 1(*a*)-1(*b*) are explanatory drawings schematically illustrating a configuration of a light emitting apparatus 1 including a light guide plate 20 according to one or more embodiments of the present invention. FIG. 1(a) is a top view of the light emitting apparatus 1, and FIG. 1(b) is a perspective view of the light emitting apparatus 1.

The light emitting apparatus 1 displays a plurality of line objects such as diagrams, texts, or picture patterns on a front surface (light exit surface) 20b of the light guide plate (light guide body) 20, and allows the plurality of line objects to be stereoscopically visually recognized by causing the plurality of line objects to differ in sense of perspective which sense is given to an observer. The light emitting apparatus 1 is suitably provided in, for example, an amusement machine such as a pachinko machine or a slot machine, and is used to variously carry out visual representation.

The light emitting apparatus 1 includes a light source 10 and the light guide plate 20 (see FIGS. 1(a) and 1(b)).

(Light Source 10)

The light source 10 is a light emitting device which emits light toward a side surface 20a of the light guide plate 20. The light source 10 is provided so as to face the side surface 20a of the light guide plate 20. Light emitted from the light source 10 enters the light guide plate 20 through the side surface 20a.

According to one or more embodiments of the present invention, three light sources 10a, 10b, and 10c are provided as the light source 10. The light sources 10a, 10b, and 10c emit respective beams of light which are identical in light intensity. The light sources 10a, 10b, and 10c are provided along the side surface 20a so as to be identical in angle at which light is incident on the side surface 20a of the light guide plate 20.

The light sources 10a, 10b, and 10c are not particularly limited in type. For example, a light source having a directivity such as an LED (Light Emitting Diode) is suitably usable.

Note that the respective beams of light emitted by the light sources 10a, 10b, and 10c are not particularly limited in color. The light sources 10a, 10b, and 10c may emit respective beams of light which differ in color (e.g., red light, blue light, and green light). Alternatively, the light sources 10a, 10b, and 10c may emit respective beams of light which are identical in color.

Further, the number of light sources 10 to be provided and positions of the light sources 10 are not particularly limited. For example, one light source 10 may be provided for the side surface 20a of the light guide plate 20. Alternatively, one light source 10, or two or more light sources 10 may be provided for a plurality of side surfaces of the light guide plate 20. In addition, a plurality of light sources 10 may be provided at intervals of, for example, not less than 5 mm along the side surface 20a of the light guide plate 20.

(Light Guide Plate 20)

The light guide plate 20 is a light guide member which guides light having entered the light guide plate 20 from the light source 10 and causes the light to exit through each of light emitting regions A, B, and C set in the front surface 20b. The light guide plate 20 is a plate-like transparent member made of a material which totally reflects light (e.g., an acrylic resin).

The respective beams of light emitted from the light sources 10a, 10b, and 10c and having entered the light guide plate 20 through the side surface 20a of the light guide plate 20 propagate through the light guide plate 20 while being totally reflected by the front surface 20b and a back surface (counter surface) 20c of the light guide plate 20. The beam of light from the light source 10a exits through the light emitting region A set in the front surface 20b of the light guide plate 20. The beam of light from the light source 10b exits through the light emitting region B set in the front surface 20b of the light guide plate 20. The beam of light from the light source 10c exits through the light emitting region C set in the front surface 20b of the light guide plate 20.

Figure 2:
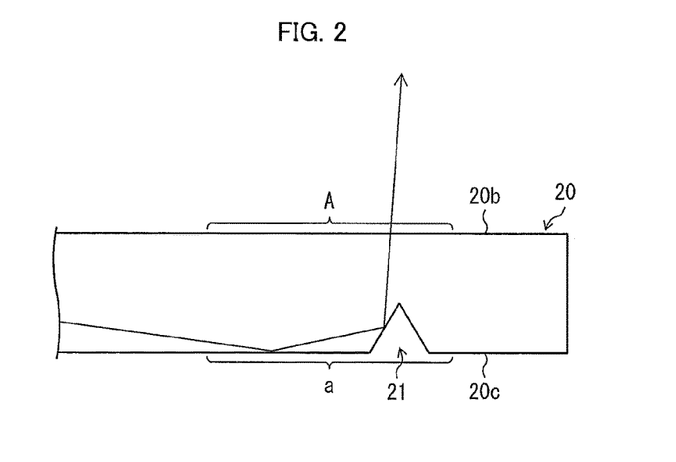
FIG. 2 is a cross-sectional view illustrating a reflection pattern provided in the light guide plate illustrated in FIGS. 1(*a*)-1(*b*).

FIG. 2 is a cross-sectional view illustrating a reflection pattern 21 provided in the light guide plate 20. As illustrated in FIG. 2, a linearly arranged pattern group a in which a plurality of reflection patterns 21 for regularly reflecting, toward the light emitting region A, the beam of light having entered the light guide plate 20 from the light source 10a and propagating through the light guide plate 20 are linearly arranged is provided in a region of the back surface 20c of the light guide plate 20, the region corresponding to the light emitting region A (FIG. 2 illustrates only one reflection pattern 21 provided in the linearly arranged pattern group a). The plurality of reflection patterns 21 each have an inclined surface (reflection surface) which reflects, toward the light emitting region A, the beam of light emitted from the light source 10a and having entered the light guide plate 20 through the side surface 20a of the light guide plate 20.

As in the case of the linearly arranged pattern group a, a linearly arranged pattern group b in which a plurality of reflection patterns 21 each having an inclined surface (reflection surface) which reflects, toward the light emitting region B, the beam of light emitted from the light source 10b are linearly arranged is provided in a region of the back surface 20c of the light guide plate 20. Further, a linearly arranged pattern group c in which a plurality of reflection patterns 21 each having an inclined surface (reflection surface) which reflects, toward the light emitting region C, the beam of light emitted from the light source 10c are linearly arranged is provided in a region of the back surface 20c of the light guide plate 20.

According to one or more embodiments of the present invention, a reflection pattern 21 is a groove which is perpendicular to the back surface 20c of the light guide plate 20, which has a cross section that is substantially isosceles triangular-shaped (V-shaped) and is parallel to a direction in which light is guided, and which is formed by notching the back surface 20c of the light guide plate 20 so that the groove linearly extends in a direction that is perpendicular to the cross section.

The light guide plate 20 is a so-called see-through light guide panel made of a transparent material. Therefore, in a case where the light sources 10a, 10b, and 10c are off, the reflection patterns 21 are not recognized by an observer.

According to the light guide body 20 having the configuration, when the plurality of reflection patterns 21 are seen from a direction perpendicular to the front surface 20b, a ratio of a projected area of the plurality of reflection patterns 21 to a projected area of the entire front surface 20b according to one or more embodiments of the present invention is not more than 15%, and, according to one or more embodiments of the present invention, the ratio is not more than 8%. This can prevent the observer from recognizing the plurality of reflection patterns 21 in a case where the light sources 10a, 10b, and 10c are off.

Note that the reflection pattern 21 is not limited to a groove-shaped pattern formed by notching the back surface 20c of the light guide plate 20. For example, the reflection pattern 21 may be provided so as to protrude outside from the back surface 20c of the light guide plate 20. The reflection pattern 21 does not need to be provided so as to be integral with the light guide plate 20. For example, the reflection pattern 21 may be attached to the back surface 20c of the light guide plate 20.

Note that the light guide plate 20 may have not only a shape having a flat surface but also a shape having, for example, a spherical surface or a free-form surface. According to one or more embodiments of the present invention, the light guide plate 20, which has a plate-like shape, is used as the light guide body. Alternatively, the light guide plate 20 may have a shape other than the plate-like shape such as a cylindrical shape.

Figure 3:
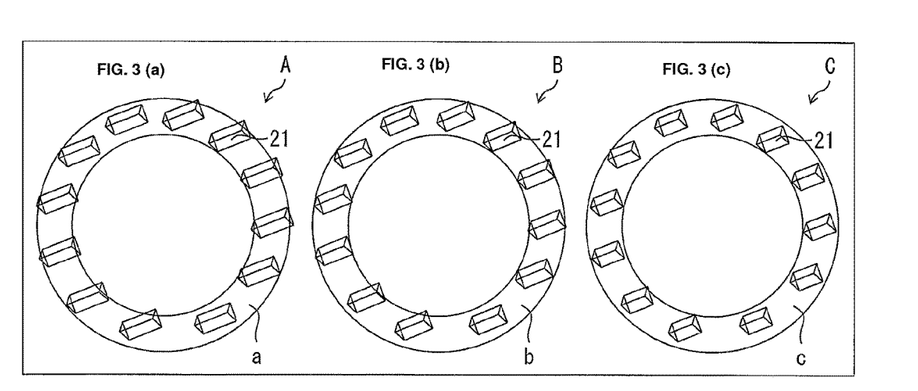

FIG. 3(a)-3(c) are top views illustrating the respective light emitting regions A, B, and C illustrated in FIGS. 1(a)-1(b). As illustrated in FIGS. 3(a)-3(c), the linearly arranged pattern groups a, b, and c, in each of which the plurality of reflection patterns 21 are linearly arranged, are provided in the respective regions of the back surface 20c of the light guide plate 20, which regions correspond to the respective light emitting regions A, B, and C.

As illustrated in FIG. 3(a), the linearly arranged pattern group a corresponding to the light emitting region A includes the plurality of reflection patterns 21 which are circularly arranged so that their reflection surfaces are substantially parallel to each other. The plurality of reflection patterns 21 are arranged so that an angle formed by each of the reflection surfaces and an optical axis of the light source 10a is a right angle when the plurality of reflection patterns 21 are seen from a direction perpendicular to the back surface 20c of the light guide plate 20. The beam of light from the light source 10a is reflected by the plurality of reflection patterns 21 toward the observer.

As illustrated in FIG. 3(b), the linearly arranged pattern group b corresponding to the light emitting region B includes the plurality of reflection patterns 21 which are circularly arranged so that their reflection surfaces are substantially parallel to each other. The plurality of reflection patterns 21 are arranged so that an angle formed by each of the reflection surfaces and an optical axis of the light source 10b is a right angle when the plurality of reflection patterns 21 are seen from the direction perpendicular to the back surface 20c of the light guide plate 20. The beam of light from the light source 10b is reflected by the plurality of reflection patterns 21 toward the observer.

As illustrated in FIG. 3(c), the linearly arranged pattern group c corresponding to the light emitting region C includes the plurality of reflection patterns 21 which are circularly arranged so that their reflection surfaces are substantially parallel to each other. The plurality of reflection patterns 21 are arranged so that an angle formed by each of the reflection surfaces and an optical axis of the light source 10c is a right angle when the plurality of reflection patterns 21 are seen from the direction perpendicular to the back surface 20c of the light guide plate 20. The beam of light from the light source 10c is reflected by the plurality of reflection patterns 21 toward the observer.

Note here that according to one or more embodiments of the present invention, the linearly arranged pattern groups a, b, and c differ in width of the reflection surfaces of the plurality of reflection patterns 21 arranged in each of the linearly arranged pattern groups a, b, and c (width of the reflection surfaces in an in-plane direction of the front surface 20b of the light guide plate 20 when the plurality of reflection patterns 21 are seen from the direction perpendicular to the front surface 20b, or length of lines of intersection of the reflection surfaces and the back surface 20c).

Specifically, the linearly arranged pattern group c, the linearly arranged pattern group b, and the linearly arranged pattern group a are ranked in increasing order of width of the reflection surfaces of the plurality of reflection patterns 21 (the linearly arranged pattern group c< the linearly arranged pattern group b< the linearly arranged pattern group a). As a result, the linearly arranged pattern group c, the linearly arranged pattern group b, and the linearly arranged pattern group a are ranked in increasing order of amount of light which reaches the observer after being reflected by each of the linearly arranged pattern groups a, b, and c.

Accordingly, assuming that a difference between an amount of light which reaches the observer after being reflected by each of the linearly arranged pattern groups a, b, and c (amount of light per unit area which light is emitted from each of the light emitting regions A, B, and C: luminance) and an amount of light which reaches the observer through a region which is adjacent to each of the linearly arranged pattern groups a, b, and c (non-light emitting region of the front surface 20b of the light guide plate 20, non-light emitting region being adjacent to each of the light emitting regions A, B, and C) (luminance: constant in one or more embodiments of the present invention) is a light amount difference, the linearly arranged pattern group c, the linearly arranged pattern group b, and the linearly arranged pattern group a are ranked in increasing order of light amount difference between the linearly arranged pattern groups a, b, and c.

As described earlier, by causing the linearly arranged pattern groups a, b, and c to differ in light amount difference, the observer can perceive that a difference in perspective occurs between the light emitting regions A, B, and C of the front surface 20b which correspond to the respective linearly arranged pattern groups a, b, and c. That is, a light emitting region (line object) corresponding to a linearly arranged pattern group which is larger in light amount difference is larger in contrast with a background and is more clearly visually recognized. Therefore, the observer perceives that the light emitting region corresponding to the linearly arranged pattern group which is larger in light amount difference is relatively near to the observer. Meanwhile, a light emitting region corresponding to a linearly arranged pattern group which is smaller in light amount difference is smaller in contrast with the background and is less clearly visually recognized. Therefore, the observer perceives that the light emitting region corresponding to the linearly arranged pattern group which is smaller in light amount difference is relatively far from the observer.

Therefore, according to one or more embodiments of the present invention, the observer perceives that the light emitting region A corresponding to the linearly arranged pattern group a, which is the largest in light amount difference, is the nearest to the observer, and the observer perceives that the light emitting region C corresponding to the linearly arranged pattern group c, which is the smallest in light amount difference, is the farthest from the observer.

As described earlier, by causing the linearly arranged pattern groups a, b, and c to differ in light amount difference, the observer can perceive that the difference in perspective occurs between the light emitting regions A, B, and C which correspond to the respective linearly arranged pattern groups a, b, and c.

Note that according to one or more embodiments of the present invention, the linearly arranged pattern groups a, b, and c differ in width of the reflection surfaces of the plurality of reflection patterns 21 arranged in each of the linearly arranged pattern groups a, b, and c. For example, the linearly arranged pattern groups a, b, and c may differ in length of the reflection surfaces in a direction of inclination of the reflection surfaces (depth from the back surface 20c to the reflection surfaces).

<Example of Arrangement of Reflection Patterns 21>

The following description discusses an example of an arrangement of the reflection patterns 21 which cause the linearly arranged pattern groups a, b, and c to differ in light amount difference.

Figure 4:
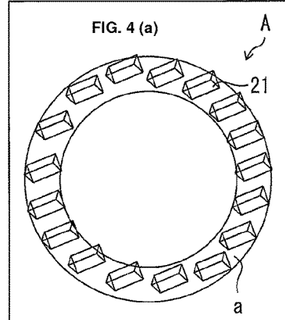

FIGS. 4(a)-4(c) are top views each showing an example of how the reflection patterns 21 are arranged in each of the linearly arranged pattern groups a, b, and c illustrated in FIGS. 3(a)-3(c). As illustrated in FIG. 4(a)-4(c), a density of arrangement of the reflection patterns 21 (the number of reflection patterns 21 arranged per unit area) may be changed for each of the linearly arranged pattern groups a, b, and c.

In this case, an increase in density of arrangement of the reflection patterns 21 causes an increase in amount of reflection of light in each of the linearly arranged pattern groups. This allows an increase in amount of light which reaches the observer after being reflected by each of the linearly arranged pattern groups.

Meanwhile, a decrease in density of arrangement of the reflection patterns 21 causes a decrease in amount of reflection of light in each of the linearly arranged pattern groups. This allows a decrease in amount of light which reaches the observer after being reflected by each of the linearly arranged pattern groups.

Therefore, the change in density of arrangement of the reflection patterns 21 for each of the linearly arranged pattern groups a, b, and c allows the linearly arranged pattern groups a, b, and c to differ in light amount difference.

Figure 5:
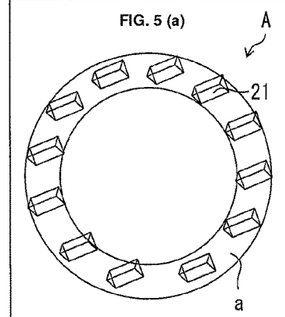

FIG. 5(a)-5(c) are top views each showing another example of how the reflection patterns 21 are arranged in each of the linearly arranged pattern groups illustrated in FIGS. 3(a)-3(c). As illustrated in FIGS. 5(a)-5(c), the linearly arranged pattern groups a, b, and c may differ in direction in which reflection surfaces of the reflection patterns 21 extend when the reflection patterns 21 are seen from the direction perpendicular to the front surface 20b of the light guide plate 20.

In this case, a change, for each of the linearly arranged pattern groups a, b, and c, in direction in which the reflection surfaces of the reflection patterns 21 extend allows the linearly arranged pattern groups a, b, and c to differ in direction in which beams of light are reflected by the respective linearly arranged pattern groups a, b, and c. Therefore, in a case where a direction of reflection of light (direction of the reflection surfaces) is set for each of the linearly arranged pattern groups a, b, and c, beams of light which come from the respective linearly arranged pattern groups a, b, and c and reach the observer can differ in amount in accordance with an assumed observation position of the observer.

Therefore, the change, for each of the linearly arranged pattern groups a, b, and c, in direction in which the reflection surfaces of the reflection patterns 21 extend allows the linearly arranged pattern groups a, b, and c to differ in light amount difference.

Figure 6:
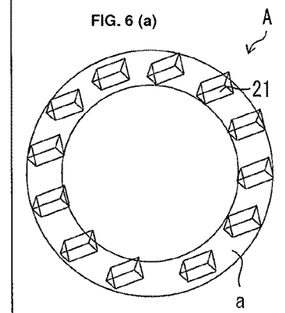

FIGS. 6(a)-6(c) are top views each showing still another example of how the reflection patterns 21 are arranged in each of the linearly arranged pattern groups illustrated in FIGS. 3(a)-3(c). As illustrated in FIGS. 6(a)-6(c), the linearly arranged pattern groups a, b, and c may differ in angle of inclination of the reflection surfaces of the reflection patterns 21 (angle formed by a reflection surface of a reflection pattern 21 and the back surface 20c of the light guide plate 20).

In this case, a change in angle of inclination of the reflection surfaces of the reflection patterns 21 for each of the linearly arranged pattern groups a, b, and c allows the linearly arranged pattern groups a, b, and c to differ in direction in which beams of light are reflected by the respective linearly arranged pattern groups a, b, and c. Therefore, in a case where a direction of reflection of light (angle of inclination of the reflection surfaces) is set for each of the linearly arranged pattern groups a, b, and c, beams of light which come from the respective linearly arranged pattern groups a, b, and c and reach the observer can differ in amount in accordance with an assumed observation position of the observer.

Therefore, the change in angle of inclination of the reflection surfaces of the reflection patterns 21 for each of the linearly arranged pattern groups a, b, and c allows the linearly arranged pattern groups a, b, and c to differ in light amount difference.

Note that the reflection surfaces of the reflection patterns 21, which are linearly arranged, do not need to be substantially parallel to each other in each of the linearly arranged pattern groups a, b, and c. For example, the reflection patterns 21 of the linearly arranged pattern group a may be configured such that an angle formed by (i) a straight line connecting the light source 10a and a center of a corresponding reflection pattern 21 (i.e., a center of a direction in which a reflection surface of that reflection pattern 21 extends when the reflection pattern 21 is seen from a direction perpendicular to the back surface 20c of the light guide plate 20) and (ii) the reflection surface of the reflection pattern 21 is changed continuously or intermittently.

<Example of Light Emission of Light Guide Plate 20>

Next, the following description discusses an example of a light emitting state of the light guide plate 20 of one or more embodiments of the present invention.

Figure 7:
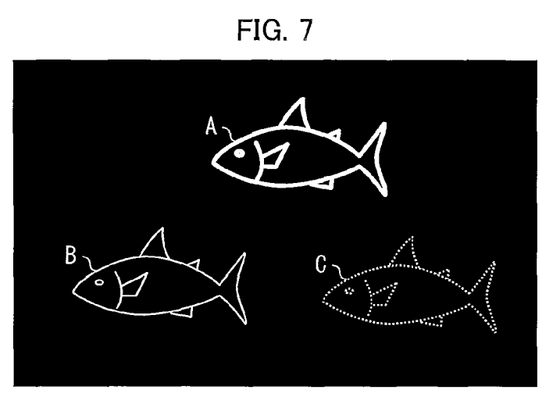
FIG. 7 is an explanatory drawing showing an example of a light emitting state of the light guide plate according to one or more embodiments of the present invention.

FIG. 7 is an explanatory drawing showing an example of the light emitting state of the light guide plate 20 of one or more embodiments of the present invention. Note that in FIG. 7, the linearly arranged pattern group c, the linearly arranged pattern group b, and the linearly arranged pattern group a are ranked in increasing order of width of the reflection surfaces of the reflection patterns 21 arranged in each of the linearly arranged pattern groups a, b, and c. This shows a light emitting state in a case where the linearly arranged pattern group c, the linearly arranged pattern group b, and the linearly arranged pattern group a are set so as to be ranked in increasing order of light amount difference between the linearly arranged pattern groups a, b, and c.

As illustrated in FIG. 7, by forming, on the back surface 20c of the light guide plate 20, the linearly arranged pattern groups a, b, and c which have respective desired shapes (fish in the present example of light emission), the light emitting regions (line objects) A, B, and C corresponding to the respective linearly arranged pattern groups a, b, and c can emit light on the front surface 20b of the light guide plate 20.

In this case, the light emitting region A corresponding to the linearly arranged pattern group a, which is the largest in light amount difference, is large in contrast with the background. Therefore, the light emitting region A is more clearly visually recognized by the observer than the light emitting regions B and C. This allows the observer to perceive that the light emitting region A is the nearest to the observer of the light emitting regions A, B, and C.

Meanwhile, the light emitting region C corresponding to the linearly arranged pattern group c, which is the smallest in light amount difference, is small in contrast with the background. Therefore, the light emitting region C is less clearly visually recognized by the observer than the light emitting regions A and B. This allows the observer to perceive that the light emitting region A is the farthest from the observer of the light emitting regions A, B, and C.

As described earlier, by causing the linearly arranged pattern groups a, b, and c to differ in light amount difference, the observer can perceive that the difference in perspective occurs between the light emitting regions A, B, and C which correspond to the respective linearly arranged pattern groups a, b, and c.

Note that according to the light emitting apparatus 1, the beams of light reflected by the respective linearly arranged pattern groups a, b, and c may differ in hue and saturation instead of or in addition to light amount difference. In other words, the linearly arranged pattern groups a, b, and c may differ in color difference between the light which reaches the observer after being reflected by each of the linearly arranged pattern groups a, b, and c and the light which reaches the observer through the region which is adjacent to each of the linearly arranged pattern groups a, b, and c. The color difference is obtained by numerically expressing a difference in color based on three components: brightness (light amount difference (mentioned above)), hue, and saturation.

By causing the linearly arranged pattern groups a, b, and c to differ in color difference, it is possible to carry out light emission control, e.g., light emission control for causing a light emitting region corresponding to one linearly arranged pattern group to emit light in relatively bright, vivid, and deep color, and causing a light emitting region corresponding to another linearly arranged pattern group to emit light in relatively dark, dim, and light color.

Accordingly, by causing the linearly arranged pattern groups a, b, and c to differ in color difference, the observer can perceive that the difference in perspective occurs between the light emitting regions A, B, and C which correspond to the respective linearly arranged pattern groups a, b, and c. In this case, according to one or more embodiments of the present invention, the linearly arranged pattern groups a, b, and c differ in color difference by not less than 6.5. This allows the observer to suitably perceive that the difference in perspective occurs between the light emitting regions A, B, and C.

<Effect of Light Emitting Apparatus 1>

The light emitting apparatus 1 of one or more embodiments of the present invention includes the light guide plate 20 which guides light having entered the light guide plate 20 from each of the light sources 10a, 10b, and 10c and causes the light to exit through the front surface 20b. The light guide plate 20 includes: the plurality of linearly arranged pattern groups a, b, and c in each of which the plurality of reflection patterns 21 for reflecting the light from each of the light sources 10a, 10b, and 10c are linearly arranged, the plurality of linearly arranged pattern groups a, b, and c differing in light amount difference, the light amount difference being a difference between an amount of light which reaches an observer of the front surface 20b after being reflected by each of the plurality of linearly arranged pattern groups a, b, and c and an amount of light which reaches the observer through a region which is adjacent to each of the plurality of linearly arranged pattern groups a, b, and c, or the plurality of linearly arranged pattern groups a, b, and c differing in color difference between the light which reaches the observer of the front surface 20b after being reflected by each of the plurality of linearly arranged pattern groups a, b, and c and the light which reaches the observer through the region which is adjacent to each of the plurality of linearly arranged pattern groups a, b, and c.

According to the light emitting apparatus 1, by causing the plurality of linearly arranged pattern groups a, b, and c to differ in light amount difference or color difference, the observer of the front surface 20b of the light guide plate 20 can perceive that a difference in perspective occurs between the light emitting regions (line objects) A, B, and C which correspond to the respective plurality of linearly arranged pattern groups a, b, and c and which are displayed on the front surface 20b of the light guide plate 20. For example, since a light emitting region corresponding to a linearly arranged pattern group which is relatively large in light amount difference or color difference is larger in contrast with a background and is more clearly visually recognized, the observer perceives that the light emitting region is relatively near to the observer. Meanwhile, since a light emitting region corresponding to a linearly arranged pattern group which is relatively small in light amount difference or color difference is smaller in contrast with the background and is less clearly visually recognized, the observer perceives that the light emitting region is relatively far from the observer.

As described earlier, by causing the plurality of linearly arranged pattern groups a, b, and c to differ in light amount difference or color difference, the observer can perceive that the difference in perspective occurs between the light emitting regions A, B, and C which correspond to the respective plurality of linearly arranged pattern groups a, b, and c.

Therefore, one or more embodiments of the present invention makes it possible to provide the light emitting apparatus 1 which, by causing the difference in perspective between the light emitting regions A, B, and C, allows the observer to stereoscopically visually recognize the light emitting regions A, B, and C.

MODIFIED EXAMPLES

Modified Example 1

FIGS. 8(a)-8(e) are top views each showing a modified example of the light emitting region A illustrated in FIGS. 1(a)-1(b). As illustrated in FIGS. 8(a)-8(e), a plurality of reflection patterns 21 may further be arranged in a region surrounded by the linearly arranged pattern group a.

This allows a linear light emitting region (line part) of the front surface 20b of the light guide plate 20, the linear light emitting region corresponding to the linearly arranged pattern group a, and a region of the front surface 20b which region is surrounded by the linear light emitting region (an inside of the line part) to further emit light. Accordingly, it is possible to realize various displays and consequently improve a visual effect in stereoscopic view.

Note here that, as illustrated in FIG. 8(a), in a case where the reflection patterns 21 are arranged so that an amount of light which reaches the observer after being reflected by the linearly arranged pattern group a and an amount of light which reaches the observer after being reflected by the plurality of reflection patterns 21 arranged in the region surrounded by the linearly arranged pattern group a are equal to each other, the light emitting region A is visually recognized by the observer as a circular object which emits light at a uniform brightness.

Therefore, as illustrated in FIG. 8(b)-8(e), the reflection patterns 21 according to one or more embodiments of the present invention are arranged so that the amount of the light which reaches the observer after being reflected by the linearly arranged pattern group a is larger than the amount of the light which reaches the observer after being reflected by the plurality of reflection patterns 21 arranged in the region surrounded by the linearly arranged pattern group a.

This allows light emission control, e.g., light emission control for causing the linear light emitting region corresponding to the linearly arranged pattern group a to relatively brightly emit light (to be highlighted), and causing the region surrounded by the linear light emitting region to relatively darkly emit light.

Figure 8:
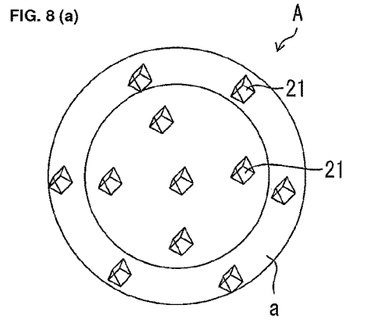

In order to carry out such light emission control, for example, as illustrated in FIG. 8(*b*), the width of the reflection surfaces of the plurality of reflection patterns 21 arranged in the linearly arranged pattern group a (length of the reflection surfaces when the plurality of reflection patterns 21 are seen from the direction perpendicular to the front surface 20*b* of the light guide plate 20) may be larger than a width of reflection surfaces of the plurality of reflection patterns 21 arranged in the region surrounded by the linearly arranged pattern group a.

Further, as illustrated in FIG. 8(*c*), the density of the plurality of reflection patterns 21 arranged in the linearly arranged pattern group a (the number of reflection patterns 21 arranged per unit area) may be higher than a density of the plurality of reflection patterns 21 arranged in the region surrounded by the linearly arranged pattern group a.

Furthermore, as illustrated in FIG. 8(*d*), when seen from the direction perpendicular to the front surface 20*b* of the light guide plate 20, the plurality of reflection patterns 21 arranged in the linearly arranged pattern group a and the plurality of reflection patterns 21 arranged in the region surrounded by the linearly arranged pattern group a may differ in direction in which the reflection surfaces of the reflection patterns 21 extend. In this case, by setting the direction of the reflection surfaces of the reflection patterns 21 so that a larger amount of light reflected by the linearly arranged pattern group a travels to the observer, the amount of the light which reaches the observer after being reflected by the linearly arranged pattern group a can be larger than the amount of the light which reaches the observer after being reflected by the plurality of reflection patterns 21 arranged in the region surrounded by the linearly arranged pattern group a.

Moreover, as illustrated in FIG. 8(*e*), the plurality of reflection patterns 21 arranged in the linearly arranged pattern group a and the plurality of reflection patterns 21 arranged in the region surrounded by the linearly arranged pattern group may differ in angle of inclination. Also in this case, by setting the angle of inclination of the reflection patterns 21 so that a larger amount of light reflected by the linearly arranged pattern group a travels to the observer, the amount of the light which reaches the observer after being reflected by the linearly arranged pattern group a can be larger than the amount of the light which reaches the observer after being reflected by the plurality of reflection patterns 21 arranged in the region surrounded by the linearly arranged pattern group a.

Note that (i) the plurality of reflection patterns 21 arranged in the linearly arranged pattern group a and (ii) the plurality of reflection patterns 21 arranged in the region surrounded by the linearly arranged pattern group a may reflect respective beams of light from light sources which differ from each other. This allows light emission control, e.g., light emission control for causing the linear light emitting region corresponding to the linearly arranged pattern group a and the region of the front surface 20*b* which region is surrounded by the linear light emitting region to emit respective beams of light in different colors.

Modified Example 2

Figure 9:
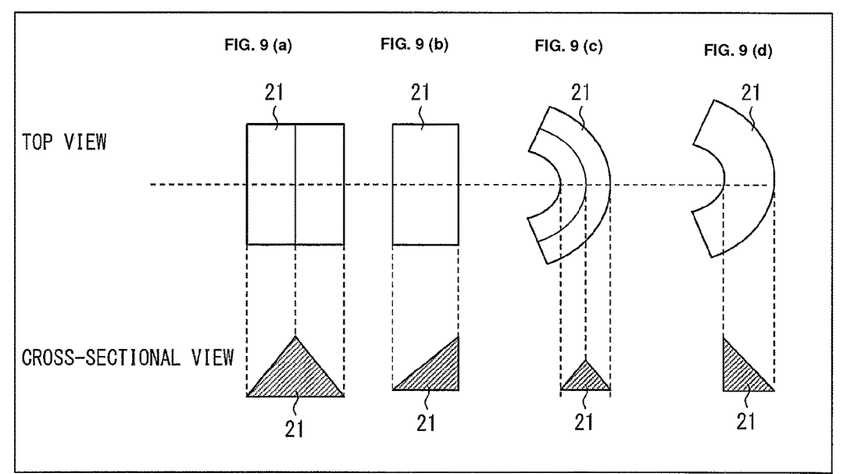

FIGS. 9(*a*)-9(*d*) are cross-sectional views each showing a modified example of a shape of the reflection pattern 21. An upper part of each of FIGS. 9(*a*)-9(*d*) is a top view of the reflection pattern 21, and a lower part of each of FIGS. 9(*a*)-9(*d*) is a cross-sectional view of the reflection pattern 21.

According to one or more embodiments of the present invention described earlier, as illustrated in FIG. 9(*a*), a groove which has a cross section that has a substantially isosceles triangular shape having two inclined surfaces is formed as the reflection pattern 21. Note, however, that the shape of the reflection pattern 21 can be appropriately changed in accordance with, for example, position(s) at which the light source(s) 10 is/are provided, the number of the light source(s) 10, a type of an object to be displayed, and/or a direction in which light is reflected.

For example, as illustrated in FIG. 9(*b*), it is possible to form, as the reflection pattern 21, a groove which has a cross section that has a substantially right triangular shape having one inclined surface. In this case, the reflection pattern 21 is formed so that the inclined surface is located in a direction in which light is incident on the reflection pattern 21.

Further, as illustrated in FIG. 9(*c*) and FIG. 9(*d*), the reflection pattern 21 may have a curved pattern shape instead of a linear pattern shape.

The present invention is not limited to the description of the embodiments above, but may be altered by a skilled person within the scope of the claims. That is, an embodiment based on a proper combination of technical means altered within the scope of the claims is encompassed in the technical scope of the present invention.

A light guide body according to one or more embodiments of the present invention guides light having entered the light guide body from at least one light source and causes the light to exit through a light exit surface of the light guide body, the light guide body including: a plurality of linearly arranged pattern groups in each of which a plurality of reflection patterns for reflecting the light from the at least one light source toward the light exit surface are linearly arranged, at least one of the plurality of linearly arranged pattern groups differing from the other(s) of the plurality of linearly arranged pattern groups in light amount difference, the light amount difference being a difference between an amount of light which reaches an observer of the light exit surface after being reflected by each of the plurality of linearly arranged pattern groups and an amount of light which reaches the observer through a region which is adjacent to each of the plurality of linearly arranged pattern groups, or the at least one of the plurality of linearly arranged pattern groups differing from the other(s) of the plurality of linearly arranged pattern groups in color difference between the light which reaches the observer of the light exit surface after being reflected by each of the plurality of linearly arranged pattern groups and the light which reaches the observer through the region which is adjacent to each of the plurality of linearly arranged pattern groups.

According to the configuration, by causing the plurality of linearly arranged pattern groups to differ in light amount difference or color difference, the observer of the light exit surface can perceive that a difference in perspective occurs between linear light emitting regions (lines) of the light exit surface which correspond to the respective plurality of linearly arranged pattern groups. The color difference is obtained by numerically expressing a difference in color based on three components: brightness (light amount difference (mentioned above)), hue, and saturation.

For example, since a light emitting region corresponding to a linearly arranged pattern group which is relatively large in light amount difference or color difference is larger in contrast with a background and is more clearly visually recognized, the observer perceives that the light emitting region is relatively near to the observer. Meanwhile, since a light emitting region corresponding to a linearly arranged pattern group which is relatively small in light amount difference or color difference is smaller in contrast with the background and is less clearly visually recognized, the observer perceives that the light emitting region is relatively far from the observer.

As described earlier, by causing the plurality of linearly arranged pattern groups to differ in light amount difference or color difference, the observer can perceive that the difference in perspective occurs between the light emitting regions which correspond to the respective plurality of linearly arranged pattern groups.

Therefore, the configuration makes it possible to provide the light guide body which, by causing the difference in perspective between the light emitting regions, allows the observer to stereoscopically visually recognize the light emitting regions.

The light guide body according to one or more embodiments of the present invention may be configured such that the at least one of the plurality of linearly arranged pattern groups differs from the other(s) of the plurality of linearly arranged pattern groups in width of reflection surfaces of the plurality of reflection patterns in an in-plane direction of the light exit surface when the plurality of reflection patterns are seen from a direction perpendicular to the light exit surface.

According to the configuration, by causing the plurality of linearly arranged pattern groups to differ in width of the reflection surfaces of the plurality of reflection patterns (length of the reflection surfaces which extend in a direction parallel to the light exit surface), the plurality of linearly arranged pattern groups can differ in amount of reflection of light.

For example, an increase in width of the reflection surfaces of the plurality of reflection patterns arranged in each of the plurality of linearly arranged pattern groups causes an increase in amount of reflection of light in each of the plurality of linearly arranged pattern groups. This allows an increase in amount of light which reaches the observer after being reflected by each of the plurality of linearly arranged pattern groups. Meanwhile, a decrease in width of the reflection surfaces of the plurality of reflection patterns arranged in each of the plurality of linearly arranged pattern groups causes a decrease in amount of reflection of light in each of the plurality of linearly arranged pattern groups. This allows a decrease in amount of light which reaches the observer after being reflected by each of the plurality of linearly arranged pattern groups.

Therefore, the configuration allows the plurality of linearly arranged pattern groups to differ in light amount difference or color difference.

The light guide body according to one or more embodiments of the present invention may be configured such that the at least one of the plurality of linearly arranged pattern groups differs from the other(s) of the plurality of linearly arranged pattern groups in density of arrangement of the plurality of reflection patterns.

According to the configuration, by causing the plurality of linearly arranged pattern groups to differ in density of arrangement of the plurality of reflection patterns, it is possible to change the amount of reflection of light for each of the plurality of linearly arranged pattern groups.

For example, an increase in density of arrangement of the plurality of reflection patterns arranged in each of the plurality of linearly arranged pattern groups causes an increase in amount of reflection of light in each of the plurality of linearly arranged pattern groups. This allows an increase in amount of light which reaches the observer after being reflected by each of the plurality of linearly arranged pattern groups. Meanwhile, a decrease in density of arrangement of the plurality of reflection patterns arranged in each of the plurality of linearly arranged pattern groups causes a decrease in amount of reflection of light in each of the plurality of linearly arranged pattern groups. This allows a decrease in amount of light which reaches the observer after being reflected by each of the plurality of linearly arranged pattern groups.

Therefore, the configuration allows the plurality of linearly arranged pattern groups to differ in light amount difference or color difference.

The light guide body according to one or more embodiments of the present invention may be configured such that the at least one of the plurality of linearly arranged pattern groups differs from the other(s) of the plurality of linearly arranged pattern groups in direction in which reflection surfaces of the plurality of reflection patterns extend when the plurality of reflection patterns are seen from a direction perpendicular to the light exit surface.

According to the configuration, by causing the plurality of linearly arranged pattern groups to differ in direction in which the reflection surfaces of the plurality of reflection patterns extend, the plurality of linearly arranged pattern groups can differ in direction in which beams of light are reflected by the respective plurality of linearly arranged pattern groups. Therefore, beams of light which reach the observer can differ in amount in accordance with an observation position of the observer.

Therefore, the configuration allows the plurality of linearly arranged pattern groups to differ in light amount difference or color difference.

The light guide body according to one or more embodiments of the present invention may be configured such that the at least one of the plurality of linearly arranged pattern groups differs from the other(s) of the plurality of linearly arranged pattern groups in angle of inclination of reflection surfaces of the plurality of reflection patterns.

According to the configuration, by causing the plurality of linearly arranged pattern groups to differ in angle of inclination of the reflection surfaces of the plurality of reflection patterns, the plurality of linearly arranged pattern groups can differ in direction in which beams of light are reflected by the respective plurality of linearly arranged pattern groups. Therefore, beams of light which reach the observer can differ in amount in accordance with an observation position of the observer.

Therefore, the configuration allows the plurality of linearly arranged pattern groups to differ in light amount difference or color difference.

The light guide body according to one or more embodiments of the present invention may be configured such that the at least one of the plurality of linearly arranged pattern groups differs from the other(s) of the plurality of linearly arranged pattern groups in length of reflection surfaces of the plurality of reflection patterns in a direction of inclination of the reflection surfaces.

According to the configuration, by causing the plurality of linearly arranged pattern groups to differ in length of the reflection surfaces in the direction of inclination, the plurality of linearly arranged pattern groups can differ in amount of reflection of light.

For example, an increase in length of the reflection surfaces in the direction of inclination of the plurality of reflection patterns arranged in each of the plurality of linearly arranged pattern groups causes an increase in amount of reflection of light in each of the plurality of linearly arranged pattern groups. This allows an increase in amount of light which reaches the observer after being reflected by each of the plurality of linearly arranged pattern groups. Meanwhile, a decrease in length of the reflection surfaces in the direction of inclination of the plurality of reflection patterns arranged in each of the plurality of linearly arranged pattern groups causes a decrease in amount of reflection of light in each of the plurality of linearly arranged pattern groups. This allows a decrease in amount of light which reaches the observer after being reflected by each of the plurality of linearly arranged pattern groups.

Therefore, the configuration allows the plurality of linearly arranged pattern groups to differ in light amount difference or color difference.

The light guide body according to one or more embodiments of the present invention may be configured such that the at least one light source comprises a plurality of light sources which differ from each other, and the at least one of the plurality of linearly arranged pattern groups and the other(s) of the plurality of linearly arranged pattern groups reflect respective beams of light from the plurality of light sources.

The configuration allows light emission control, e.g., light emission control for causing a linear light emitting region of the light exit surface which linear light emitting region corresponds to the at least one of the plurality of linearly arranged pattern groups and a linear light emitting region(s) of the light exit surface which linear light emitting region(s) correspond(s) to the other(s) of the plurality of linearly arranged pattern groups to emit light in respective different colors.

The light guide body according to one or more embodiments of the present invention may be configured such that a plurality of reflection patterns are further arranged in a region surrounded by each of the plurality of linearly arranged pattern groups.

The configuration allows a linear light emitting region (line part) of the light exit surface, the linear light emitting region corresponding to each of the plurality of linearly arranged pattern groups, and a region of the light exit surface which region is surrounded by the linear light emitting region (an inside of the line part) to further emit light. Accordingly, it is possible to realize various displays and consequently improve a visual effect in stereoscopic view.

The light guide body according to one or more embodiments of the present invention may be configured such that a difference in amount occurs between the light which reaches the observer after being reflected by each of the plurality of linearly arranged pattern groups and light which reaches the observer after being reflected by the plurality of reflection patterns which are arranged in the region surrounded by each of the plurality of linearly arranged pattern groups.

According to the configuration, by, for example, causing the light which reaches the observer after being reflected by each of the plurality of linearly arranged pattern groups to be larger in amount than the light which reaches the observer after being reflected by the plurality of reflection patterns which are arranged in the region surrounded by each of the plurality of linearly arranged pattern groups, it is possible to carry out light emission control, e.g., light emission control for causing the linear light emitting region (line part) of the light exit surface, the linear light emitting region corresponding to each of the plurality of linearly arranged pattern groups, to relatively brightly emit light and to be highlighted, and causing the region (inside of the line part) of the light exit surface which region is surrounded by the linear light emitting region to relatively darkly emit light.

The light guide body according to one or more embodiments of the present invention may be configured such that a color difference occurs between the light which reaches the observer after being reflected by each of the plurality of linearly arranged pattern groups and light which reaches the observer after being reflected by the plurality of reflection patterns which are arranged in the region surrounded by each of the plurality of linearly arranged pattern groups.

According to the configuration, by causing the color difference between the light which reaches the observer after being reflected by each of the plurality of linearly arranged pattern groups and the light which reaches the observer after being reflected by the plurality of reflection patterns which are arranged in the region surrounded by each of the plurality of linearly arranged pattern groups, it is possible to carry out light emission control, e.g., light emission control for causing the linear light emitting region (line part) of the light exit surface, the linear light emitting region corresponding to each of the plurality of linearly arranged pattern groups, to emit light in relatively bright, vivid, and deep color and to be highlighted, and causing the region (inside of the line part) of the light exit surface which region is surrounded by the linear light emitting region to emit light in relatively dark, dim, and light color.

A light emitting apparatus according to one or more embodiments of the present invention includes: a light source; and a light guide body as mentioned above which guides light having entered the light guide body from the light source and causes the light to exit through a light exit surface of the light guide body.

The configuration makes it possible to provide a light emitting apparatus which, by causing the difference in perspective between the light emitting regions, allows the observer to stereoscopically visually recognize the light emitting regions.

An amusement machine according to one or more embodiments of the present invention includes a light emitting apparatus as mentioned above.

The configuration makes it possible to provide an amusement machine which, by causing the difference in perspective between the light emitting regions, allows the observer to stereoscopically visually recognize the light emitting regions.

One or more embodiments of the present invention is applicable to a light guide body which guides light having entered the light guide body from a light source and causes the light to exit through a light exit surface of the light guide body, and to a light emitting apparatus including the light guide body. For example, one or more embodiments of the present invention is suitably provided in an amusement machine such as a pachinko machine or a slot machine.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

1 Light emitting apparatus
10 Light source
10a, 10b, 10c Light source
20 Light guide plate (light guide body)
20a Side surface
20b Front surface (light exit surface)
20c Back surface
21 Reflection pattern
A, B, C Reflection region
a, b, c linearly arranged pattern group

The invention claimed is:

1. A light guide body configured to guide light that enters therein, comprising:
  a light exit surface through which light from at least one light source exits; and
  a plurality of linearly arranged pattern groups, each of which comprises a plurality of linearly arranged first reflection patterns that reflect the light from the at least one light source toward the light exit surface,
  wherein at least one of the plurality of linearly arranged pattern groups differs from at least another of the plurality of linearly arranged pattern groups in light amount difference, the light amount difference being a difference between an amount of light which reaches an observer of the light exit surface after being reflected by each of the plurality of linearly arranged pattern groups and an amount of light which reaches the observer through a region which is adjacent to each of the plurality of linearly arranged pattern groups, or
  wherein the at least one of the plurality of linearly arranged pattern groups differs from at least another of the plurality of linearly arranged pattern groups in color difference between the light which reaches the observer of the light exit surface after being reflected by each of the plurality of linearly arranged pattern groups and the light which reaches the observer through the region which is adjacent to each of the plurality of linearly arranged pattern groups,
  wherein the light guide body displays, on the light exit surface, line objects corresponding to the respective plurality of linearly arranged pattern groups, and by causing a difference in perspective between the line objects corresponding to the respective plurality of linearly arranged pattern groups which differ in light amount difference or color difference, the light guide body allows the observer to stereoscopically visually recognize the line objects,
  wherein the difference in perspective is a difference in sense of distance from the observer to the line objects, the sense being perceived by the observer by an aerial perspective, and
  wherein the at least one of the plurality of linearly arranged pattern groups differs from the another of the plurality of linearly arranged pattern groups in width of reflection surfaces of the plurality of first reflection patterns in an in-plane direction of the light exit surface when the plurality of first reflection patterns are seen from a direction perpendicular to the light exit surface.

2. A light emitting device comprising:
  the light guide body as set forth in claim 1, and
  the at least one light source, comprising a plurality of light sources that differ from each other,
  wherein the at least one of the plurality of linearly arranged pattern groups and the another of the plurality of linearly arranged pattern groups reflect respective beams of light from the plurality of light sources.

3. The light guide body as set forth in claim 1, wherein a plurality of second reflection patterns that reflect the light from the at least one light source toward the light exit surface are further arranged in a region surrounded by each of the plurality of linearly arranged pattern groups.

4. The light guide body as set forth in claim 3, wherein a difference in amount occurs between the light which reaches the observer after being reflected by each of the plurality of linearly arranged pattern groups and light which reaches the observer after being reflected by the plurality of second reflection patterns which are arranged in the region surrounded by each of the plurality of linearly arranged pattern groups.

5. The light guide body as set forth in claim 3, wherein a color difference occurs between the light which reaches the observer after being reflected by each of the plurality of linearly arranged pattern groups and light which reaches the observer after being reflected by the plurality of second reflection patterns which are arranged in the region surrounded by each of the plurality of linearly arranged pattern groups.

6. A light emitting apparatus comprising:
  the at least one light source; and
  the light guide body as recited in claim 1 which guides light having entered the light guide body from the light source and causes the light to exit through a light exit surface of the light guide body.

7. An amusement machine comprising the light emitting apparatus as recited in claim 6.

8. A light guide body configured to guide light that enters therein, comprising:
  a light exit surface through which light from at least one light source exits; and
  a plurality of linearly arranged pattern groups, each of which comprises a plurality of linearly arranged first reflection patterns that reflect the light from the at least one light source toward the light exit surface,
  wherein at least one of the plurality of linearly arranged pattern groups differs from at least another of the plurality of linearly arranged pattern groups in light amount difference, the light amount difference being a difference between an amount of light which reaches an observer of the light exit surface after being reflected by each of the plurality of linearly arranged pattern groups and an amount of light which reaches the observer through a region which is adjacent to each of the plurality of linearly arranged pattern groups, or
  wherein the at least one of the plurality of linearly arranged pattern groups differs from at least another of the plurality of linearly arranged pattern groups in color difference between the light which reaches the observer of the light exit surface after being reflected by each of the plurality of linearly arranged pattern groups and the light which reaches the observer through the region which is adjacent to each of the plurality of linearly arranged pattern groups,
  wherein the light guide body displays, on the light exit surface, line objects corresponding to the respective plurality of linearly arranged pattern groups, and by causing a difference in perspective between the line objects corresponding to the respective plurality of linearly arranged pattern groups which differ in light amount difference or color difference, the light guide body allows the observer to stereoscopically visually recognize the line objects, wherein the difference in perspective is a difference in sense of distance from the observer to the line objects, the sense being perceived by the observer by an aerial perspective, and wherein the at least one of the plurality of linearly arranged pattern groups differs from the another of the plurality of linearly arranged pattern groups in density of arrangement of the plurality of first reflection patterns.

9. An amusement machine comprising a light emitting apparatus, the light emitting apparatus including:
the at least one light source; and
the light guide body as recited in claim 8 which guides light having entered the light guide body from the light source and causes the light to exit through a light exit surface of the light guide body.

10. A light guide body configured to guide light that enters therein, comprising:
a light exit surface through which light from at least one light source exits; and
a plurality of linearly arranged pattern groups, each of which comprises a plurality of linearly arranged first reflection patterns that reflect the light from the at least one light source toward the light exit surface,
wherein at least one of the plurality of linearly arranged pattern groups differs from at least another of the plurality of linearly arranged pattern groups in light amount difference, the light amount difference being a difference between an amount of light which reaches an observer of the light exit surface after being reflected by each of the plurality of linearly arranged pattern groups and an amount of light which reaches the observer through a region which is adjacent to each of the plurality of linearly arranged pattern groups, or
wherein the at least one of the plurality of linearly arranged pattern groups differs from at least another of the plurality of linearly arranged pattern groups in color difference between the light which reaches the observer of the light exit surface after being reflected by each of the plurality of linearly arranged pattern groups and the light which reaches the observer through the region which is adjacent to each of the plurality of linearly arranged pattern groups,
wherein the light guide body displays, on the light exit surface, line objects corresponding to the respective plurality of linearly arranged pattern groups, and by causing a difference in perspective between the line objects corresponding to the respective plurality of linearly arranged pattern groups which differ in light amount difference or color difference, the light guide body allows the observer to stereoscopically visually recognize the line objects,
wherein the difference in perspective is a difference in sense of distance from the observer to the line objects, the sense being perceived by the observer by an aerial perspective, and
wherein the at least one of the plurality of linearly arranged pattern groups differs from the another of the plurality of linearly arranged pattern groups in direction in which reflection surfaces of the plurality of first reflection patterns extend when the plurality of first reflection patterns are seen from a direction perpendicular to the light exit surface.

11. An amusement machine comprising a light emitting apparatus, the light emitting apparatus including:
the at least one light source; and
the light guide body as recited in claim 10 which guides light having entered the light guide body from the light source and causes the light to exit through a light exit surface of the light guide body.

12. A light guide body configured to guide light that enters therein, comprising:
a light exit surface through which light from at least one light source exits; and
a plurality of linearly arranged pattern groups, each of which comprises a plurality of linearly arranged first reflection patterns that reflect the light from the at least one light source toward the light exit surface,
wherein at least one of the plurality of linearly arranged pattern groups differs from at least another of the plurality of linearly arranged pattern groups in light amount difference, the light amount difference being a difference between an amount of light which reaches an observer of the light exit surface after being reflected by each of the plurality of linearly arranged pattern groups and an amount of light which reaches the observer through a region which is adjacent to each of the plurality of linearly arranged pattern groups, or
wherein the at least one of the plurality of linearly arranged pattern groups differs from at least another of the plurality of linearly arranged pattern groups in color difference between the light which reaches the observer of the light exit surface after being reflected by each of the plurality of linearly arranged pattern groups and the light which reaches the observer through the region which is adjacent to each of the plurality of linearly arranged pattern groups,
wherein the light guide body displays, on the light exit surface, line objects corresponding to the respective plurality of linearly arranged pattern groups, and by causing a difference in perspective between the line objects corresponding to the respective plurality of linearly arranged pattern groups which differ in light amount difference or color difference, the light guide body allows the observer to stereoscopically visually recognize the line objects,
wherein the difference in perspective is a difference in sense of distance from the observer to the line objects, the sense being perceived by the observer by an aerial perspective, and
wherein the at least one of the plurality of linearly arranged pattern groups differs from the another of the plurality of linearly arranged pattern groups in angle of inclination of reflection surfaces of the plurality of first reflection patterns.

13. An amusement machine comprising a light emitting apparatus, the light emitting apparatus including:
the at least one light source; and
the light guide body as recited in claim 12 which guides light having entered the light guide body from the light source and causes the light to exit through a light exit surface of the light guide body.

14. A light guide body configured to guide light that enters therein, comprising:
a light exit surface through which light from at least one light source exits; and
a plurality of linearly arranged pattern groups, each of which comprises a plurality of linearly arranged first reflection patterns that reflect the light from the at least one light source toward the light exit surface, wherein at least one of the plurality of linearly arranged pattern groups differs from at least another of the plurality of linearly arranged pattern groups in light amount difference, the light amount difference being a difference between an amount of light which reaches an observer of the light exit surface after being reflected by each of the plurality of linearly arranged pattern groups and an amount of light which reaches the observer through a region which is adjacent to each of the plurality of linearly arranged pattern groups, or wherein the at least one of the plurality of linearly arranged pattern groups differs from at least another of the plurality of linearly arranged pattern groups in color difference between the light which reaches the observer of the light exit surface after being reflected by each of the plurality of linearly arranged pattern groups and the light which reaches the observer through the region which is adjacent to each of the plurality of linearly arranged pattern groups, wherein the light guide body displays, on the light exit surface, line objects corresponding to the respective plurality of linearly arranged pattern groups, and by causing a difference in perspective between the line objects corresponding to the respective plurality of linearly arranged pattern groups which differ in light amount difference or color difference, the light guide body allows the observer to stereoscopically visually recognize the line objects, wherein the difference in perspective is a difference in sense of distance from the observer to the line objects, the sense being perceived by the observer by an aerial perspective, and wherein the at least one of the plurality of linearly arranged pattern groups differs from the another of the plurality of linearly arranged pattern groups in length of reflection surfaces of the plurality of first reflection patterns in a direction of inclination of the reflection surfaces.

15. An amusement machine comprising a light emitting apparatus, the light emitting apparatus including:
the at least one light source; and
the light guide body as recited in claim 14 which guides light having entered the light guide body from the light source and causes the light to exit through a light exit surface of the light guide body.

* * * * *